(No Model.)

F. BREMERMAN.
TURNING GEAR FOR VEHICLES.

No. 299,108. Patented May 27, 1884.

Attest:
E. R. Hill
N. P. Gulick

Inventor
Fredrick Bremerman
per Wm. Hubbell Fisher,
Atty

UNITED STATES PATENT OFFICE.

FREDRICK BREMERMAN, OF INDIANAPOLIS, INDIANA, ASSIGNOR TO THE EMERSON, FISHER COMPANY, OF CINCINNATI, OHIO.

TURNING-GEAR FOR VEHICLES.

SPECIFICATION forming part of Letters Patent No. 299,108, dated May 27, 1884.

Application filed December 12, 1882. (No model.)

*To all whom it may concern:*

Be it known that I, FREDRICK BREMERMAN, of the city of Indianapolis, in Marion county and State of Indiana, have invented certain new and useful Improvements in Turning-Gear for Vehicles, of which the following is a specification.

The object of my invention is to provide an improved and simple means for preventing the forward wheels of a vehicle from coming in contact with the body, frame, gear, or other central portion of the vehicle as the latter is turned to one side or the other, thus preventing the vehicle from cramping.

Figure 1:
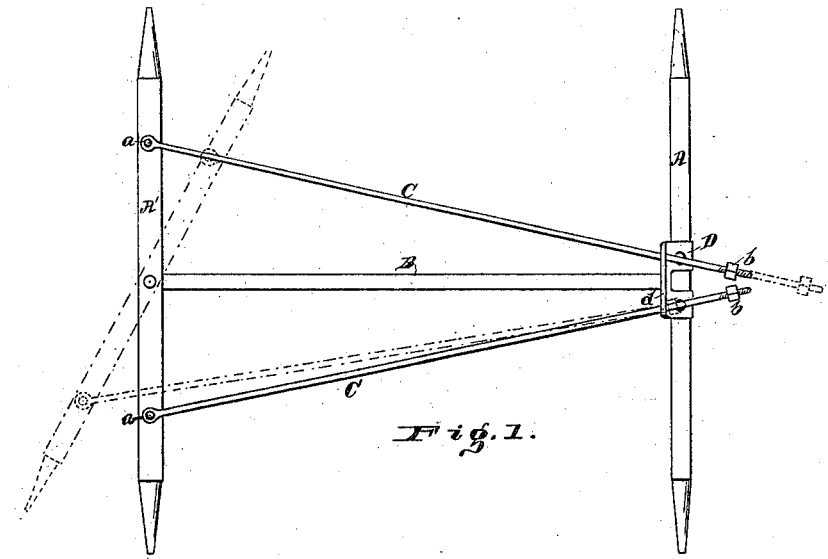
Figure 3:
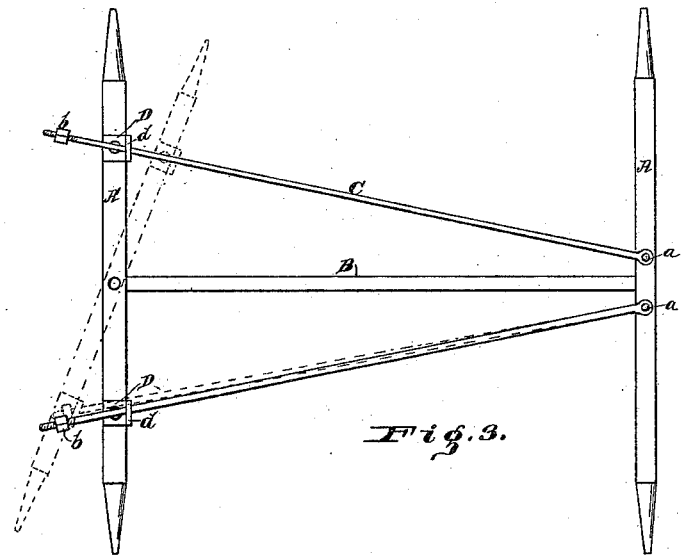
Figure 2:
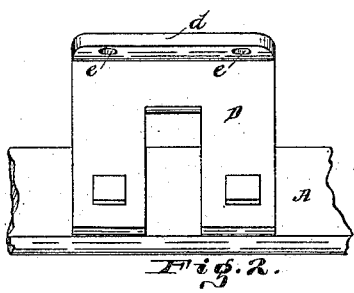

Referring to the drawings forming a part of this specification, Figure 1 represents the preferred form of my invention. Fig. 2 represents the stop-plate employed in Fig. 1. Fig. 3 represents a slight modification of the construction shown in Fig. 1, the stop-plates being attached to the front instead of the rear axle.

In the drawings the bottom or under side of the running-gear is represented.

A is the rear and A' the front axle, which are connected by the usual perch, B, which may be single, as shown, or double. To the front axle, at points near the attachment of the thill or pole couplings, are connected the front ends of the stop-rods C—one at each side of the longitudinal center of the gear—these connections between said front axle, and these stop-rods being made in any manner which will allow a slight turning of the rods in relation to these connections. A preferable mode of making such connection is as shown, and is as follows: The forward end of each rod is provided with an eye, *f*. A bolt, *a*, passes through the eye and connects the rod to the axle. These rods C pass backward to the rear axle, converging as they approach the latter. To the rear axle or rear portion of the gear is secured a suitable stop for these rods, operating substantially as hereinafter described. A preferred form of this stop is as follows, viz: A plate, D, which plate has a flange, *d*, bent at right angles to the plate, and provided with openings *e*, through which the rear portions of the rods C respectively pass and extend beyond said flange or stop *d*. Upon the end of each of these rods is screwed a nut, *b*. When the front axle is turned as shown by dotted lines in Fig. 1, the rear ends of the rods C slide through the openings *e* in the stop-plate D, one of them moving forward and the other backward, until the nut *b* on the rod, moving forward, strikes against the flange *d* of the stop-plate, and this impingement stops any further turning of the forward axle. That end portion of each of the rods which carries a nut, *b*, is preferably screw-threaded for some distance, to allow these nuts to be adjusted as desired along the rod, to regulate the distance which the front axle may be turned. The nut is so located on the rod as to prevent the front axle from turning to such an extent as to allow the wheels on this axle to come in contact with any portion of the vehicle to the rear of them. By thus preventing the forward wheels from impinging against the vehicle, they cannot cramp. The common evils consequent upon the wheels being cramped—viz., straining or breaking the wheel or other portion of the vehicle, overturning the latter, &c.—are obviated.

Instead of attaching the stop-plate D to the rear axle, the rear ends of the rods C may be pivoted or hinged to the rear axle, preferably in the manner in which in Fig. 1 they are hinged to the forward axle, and the stop-plate divided and connected to the front axle, as shown in Fig. 3, and the nuts *b* be placed on the forward ends of the rods, instead of the rear ends, the forward ends being each provided with a suitable screw and head; but the operation of this latter construction is identical with that of the construction shown in Fig. 1.

The above-described construction makes a cheap and thoroughly-effective device for preventing cramping of the vehicle in the operation of turning.

My invention is applicable to vehicles where the rear axle is made to turn instead of the forward one during the operation of turning the vehicle.

When preferred, some stationary part of the vehicle other than the stationary axle may be substituted for the stationary axle as a place for the attachment of the stops C or bolts *a*, as the case may be.

When desired, the stop-rods may be parallel, the rod-connections at or near each end of the vehicle being separated some distance apart; but I prefer to make the rods converge, for the following reason:

That feature of my invention which relates to the divergence of the stop-rods is a very valuable and important one, as it enables the rods to be compactly connected to the stationary part of the vehicle, and at the same time enables the rods to be connected to the movable axle at a distance from the center of the latter, and usually near the wheels, thereby enabling a strong purchase upon the forward axle to be obtained by the stop-rods. The device is thus rendered compact as well as effective.

What I claim as new and of my invention, and desire to secure by Letters Patent, is—

1. In combination with a vehicle, the stop-rods for controlling the rotation of the movable axle, said rods diverging from the point where they are attached to the stationary part of the vehicle to the movable axle, and stops and devices for regulating the amount of rotation of said axle, substantially as and for the purposes specified.

2. The combination of the front and rear axles, A A', connected by the perch B, and the stop-rods C, connected at one end to one of the axles, the other ends passing through openings $e$ in the stop-plate D, connected to the opposite axle, the free ends of the rods being provided with stops to engage with the stop-plate, substantially as and for the purposes specified.

3. The combination of the front and rear axles, A A', connected by the perch B, and the stop-rods C, connected at one end to one of the axles, the other ends passing through openings $e$ in the stop-plate D, connected to the opposite axle, the free ends of the rods being provided with nuts $b$, to engage with the stop-plate, substantially as and for the purposes specified.

4. The combination of the front and rear axles, A A', connected by the perch B, and the diverging stop-rods C, connected at one end to one of the axles, the other ends passing through openings $e$ in the stop-plate D, connected to the opposite axle, the free ends of the rods being provided with nuts $b$, to engage with the stop-plate, substantially as and for the purposes specified.

FREDRICK BREMERMAN.

Witnesses:
C. P. JACOBS,
WILLIAM L. TAYLOR.